April 25, 1933.     C. E. PAGE     1,905,350
DRIP COFFEE MAKER
Filed July 16, 1932     2 Sheets-Sheet 1
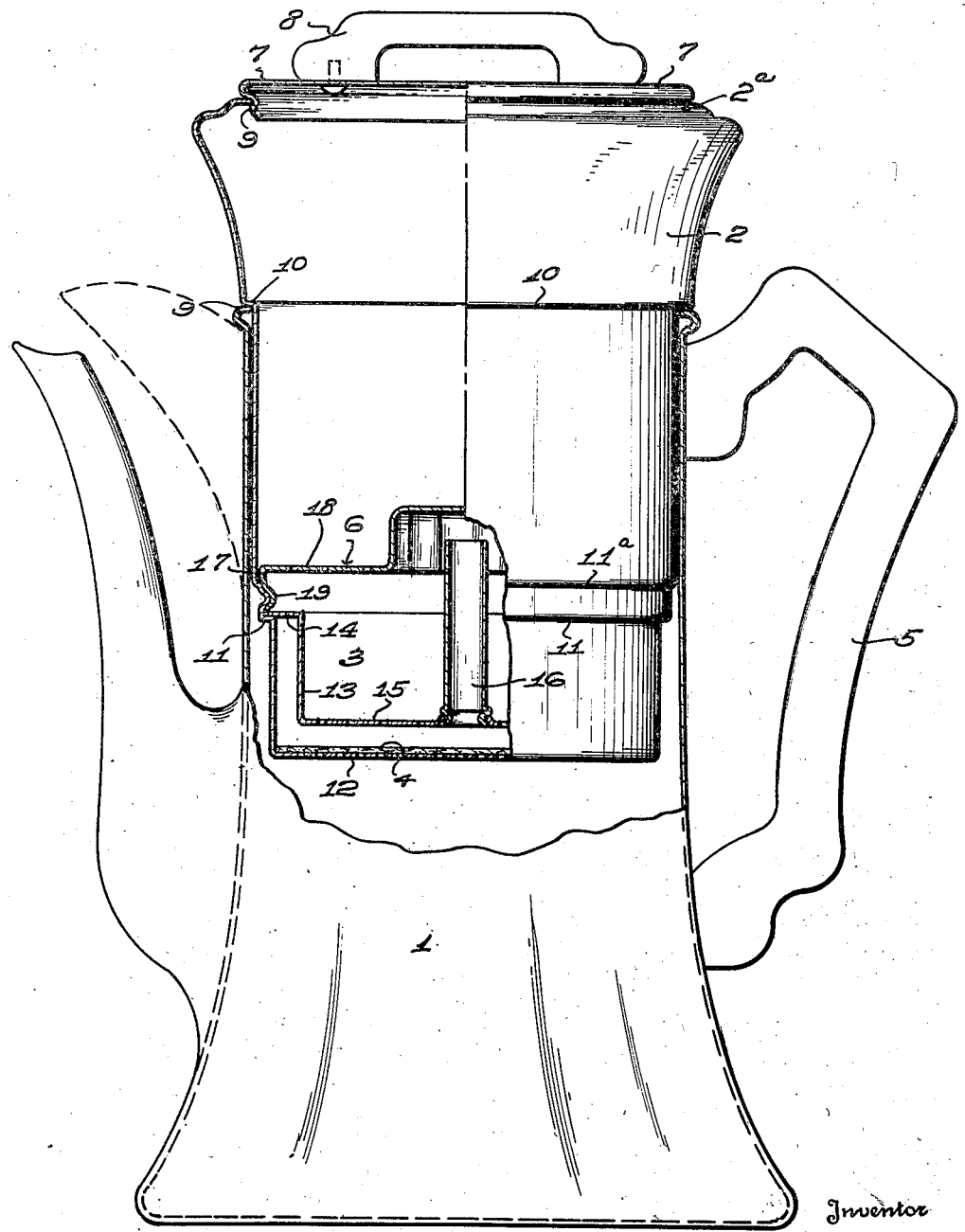
Inventor
CHARLES E. PAGE,
By A. B. Bowman
Attorney April 25, 1933.    C. E. PAGE    1,905,350
DRIP COFFEE MAKER
Filed July 16, 1932    2 Sheets-Sheet 2
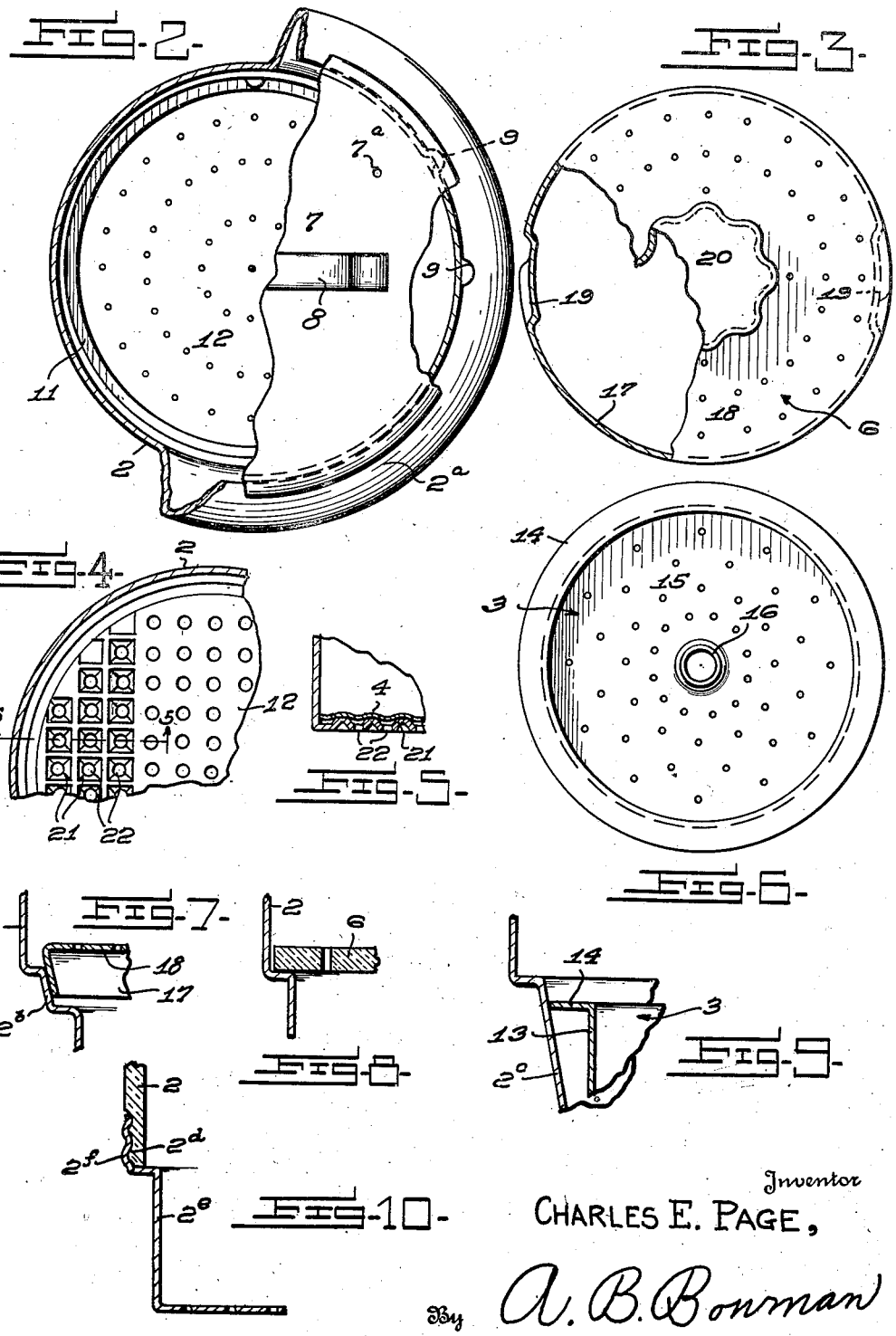
Inventor
CHARLES E. PAGE,
By A. B. Bowman
Attorney Patented Apr. 25, 1933

1,905,350

UNITED STATES PATENT OFFICE

CHARLES E. PAGE, OF LOS ANGELES, CALIFORNIA

DRIP COFFEE MAKER

Application filed July 16, 1932. Serial No. 622,970.

My invention relates to drip coffee makers and the objects of my invention are:

First, to provide a device of this class which requires the operator to pour a stipulated quantity of water through the coffee brewing element, the remainder of the water being first placed in the coffee pot;

Second, to provide a device of this class which meters the water flowing through the ground coffee so as to insure a substantially constant flow therethrough, regardless of the quantity of coffee to be brewed, thus insuring a uniform coffee brew whether or not the full capacity of the coffee maker is employed.

Third, to provide a device of this class in which the ground coffee is held away from the filter paper, assuming filter paper is used, thus preventing the rupturing of the paper and permitting of a ready flow of the coffee brew therethrough;

Fourth, to provide a device in which brews can be economically and satisfactorily made in less quantity than the approximate maximum capacity of the device by the use of a supplementary ground coffee container;

Fifth, to provide a device of this class in which a non-metallic casing such as glass, earthenware, china or enameled ware may be used for the coffee making element, in which case there is provided a novel means for attaching the ground coffee compartment;

Sixth, to provide a device of this class in which the filtering element is supported in spaced relation to the openings in the floor of the coffee compartment when using a type of bottom formed of a series of closely arranged perforated pyramids;

Seventh, to provide a coffee maker that is so constructed as to avoid the creases and riveted parts coming in contact with the made brew thereby preventing the accretion of coffee fats which are prone to turn rancid, thereby spoiling the brew;

Eighth, to provide on the whole a novelly constructed drip coffee maker which, because of simplicity, insures economical production costs and ease of use, which is durable, efficient in its action, and will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings, and to the characters of reference thereon, which form a part of this application, in which:

Figure 1 is a longitudinal sectional view of the drip coffee maker, parts being shown in elevation, Figure 2 is a plan view of the coffee maker, parts in section and parts omitted, Figure 3 is a plan view of a baffle plate, parts being shown in section, Figure 4 is a fragmentary horizontal section of a modified form of bottom of the coffee maker, Figure 5 is a fragmentary section taken on line 5—5 of Figure 4, Figure 6 is a plan view of the supplementary ground coffee container, Figure 7 is a fragmentary section illustrating a modified form of supporting means for the baffle plate, Figure 8 is a similar view of a further modification thereof, Figure 9 is a fragmentary vertical section of a modified form of support for the supplementary ground coffee container, and Figure 10 is a fragmentary vertical section illustrating a structure adapting the coffee maker to a body formed of such material as glass, china, porcelain, etc.

Similar characters of reference refer to similar parts and portions throughout the several figures of the drawings.

Pot 1, casing 2, supplementary ground coffee container 3, filter element 4, handle 5, baffle member 6, cover 7, illustrate the principal portions of my novel coffee maker.

The drip coffee maker is supported at the top or upper portion of the pot 1, such pot being formed of any suitable material, such as metal, glass, earthenware, or enamel ware. The maker embodies a casing 2, preferably formed of metal, although it may be formed of any of the above-mentioned materials.

This casing is flared at its upper end, and its material turned inwardly for forming a top 2ª. The top 2ª is provided with an enlarged opening for receiving a cover 7 having a handle 8. The cover 7 is provided with a vent opening 7ª. The top is held against displacement by a boss and notch engagement as shown at 9. It might be stated at this point that the opening in the top 2ª is identical with the open end of the pot 1, thus making the cover 7 interchangeable. The casing 2 is reduced intermediate its ends for forming an annular shoulder 10, adapted to be supported upon the upper end of the pot. The casing is further reduced for forming a second shoulder 11, adapted to support both the baffle plate 6, and the supplementary ground coffee container thereon. The casing is further provided with a third shoulder 11ª intermediate the shoulders 10 and 11, for a purpose to be hereinafter described. The casing is closed at its lower end, as at 12, and this lower end is provided with a series of relatively small perforations distributed over its area. The casing 2 is adapted to fit snugly within the open end of the pot 1, this guarding against the passage of air thereabout. The upper portion of the casing serves as a water compartment.

The ground coffee container 3 is of cup-like formation, having straight or tapered side walls 13, and an outwardly extending annular flange 14. The flange 14 is adapted to rest upon the shoulder 11, in use, and will normally be held in such position due to its own weight and that of the coffee. The container 3 is provided with an open upper end and an integral bottom 15. The bottom 15 has a series of relatively small holes formed therein, of such size as to prevent the passage of ground coffee therethrough, and to properly time the passage of water therethrough. The area of the holes in the bottom 15 are inversely proportional to the width of the container and directly proportional to its depth.

The container 3 is further provided with a centrally disposed handle 16 which may be of tubular formation, joined with the bottom 15 by swedging or otherwise, and this handle extends for a substantial distance above the top of the container. As clearly shown, the handle is formed entirely open throughout its length which serves to facilitate the cleaning thereof.

A baffle member or water spreader 6 is provided with a plurality of perforations, (see Figure 3) of a size and number which will properly time the passage of water into the coffee compartment and is provided for evenly distributing the water to the coffee compartment and/or to the container 3, and this member 6 is of inverted cup-like formation having relatively short side walls 17 and a flat top 18 integral therewith. The member 6 is adapted to have its side walls 17 rest upon the flange 14 of the container 3, when such container is used, otherwise resting on shoulder 11ª, and is held in such position against accidental displacement by a pair of bayonet slot connections 19 with the reduced walls of the container 2. This connection will insure of the container 3 and of baffle 6 remaining in fixed position during the brewing of the coffee, or when the pot is inclined as in pouring. The member 6 is provided with an integral upstanding extruded handle portion 20, having its side walls paneled, serrated or corrugated, as shown, for convenience in rotating said baffle plate to locking position. The handle 20 further serves as a dead air space for receiving the air that is displaced by the passage of water into the coffee compartment. As shown, the handle 16 of the container 3 terminates within the handle 20 and above the top of the member 6.

If found desirable, a filtering medium of paper, cloth, or other material 4 may be employed. In such cases, the filtering medium is placed upon the bottom 12 of the casing 2.

In Figure 5 is illustrated a modified form of bottom for the container 2. In this form of the invention, the material of the bottom is pressed outwardly for forming a series of closely arranged small inverted pyramids 21, each in turn having an opening through its center, as at 22. With a bottom of this nature, a filtering medium 4 may be employed which will hammock across the bases of the pyramids, thereby increasing the filtering area of the filter medium.

In Figure 7 is illustrated a novel form of rest for the baffle member 6. In this case, the reduced portion of the casing 2 has conical walls, as at 2ᵇ, and the side walls 17 of the member 6 are likewise formed conical. In the use of this form of the invention, the member 6 will partake of a snug binding fit upon the walls 2ᵇ, and such fit will be sufficiently tight as to avoid displacement in use.

Figure 8 illustrates the use of a baffle plate of glass or other relatively heavy material. Since glass, or the like, is so heavy, it has been found that the weight of the plate alone will be sufficient to retain it upon the shoulder without other securing means.

Figure 9 illustrates a modified method of mounting the supplementary ground coffee container. In this form, the lowermost reduced portion of the casing 2 has its side walls tapered as at 2ᶜ, and below the shoulder 11, and the flange 14 will naturally seek a proper seat thereon through the medium of its own weight. In this form of the invention, the lower portion of the casing 2 may be slightly extended or the walls 13 of the container 3 may be slightly shortened in order to provide that the container 3 does not either come in contact with or rest upon the bottom 12, of the casing 2.

Figure 10 illustrates the embodiment of a coffee maker employing an upper casing formed, for instance, of glass. In this form of the invention, the lower end of the casing is formed open and provided with threads 2$^d$. A continuation of the casing 2 is in the form of a metal structure 2$^e$, conforming generally to the lower end of the coffee maker already described. In this form, the member 2$^e$ is provided with an upstanding annular threaded flange 2$^f$ for engagement upon the threaded end of the casing 2. This form of the invention is particularly designed because of the desire for a device which will work perfectly and because of the fact that at the present time it appears impossible to produce this device economically in glass, or other materials in which allowances must be made for intolerances.

My drip coffee maker is operated as follows:

The casing 2 having been removed from the pot, the baffle plate 6 and supplementary ground coffee container 3 are removed. Coffee ground to the desired fineness is then placed in the supplementary coffee container 3. If an amber clear brew of coffee is desired, it is desirable to use a filtering medium 4, and if this is the case, it is placed in the bottom of the casing 2, and overlies the holes in the bottom. The container 3 is then placed in position with its supporting flange resting upon the shoulder 11. The baffle plate or water spreader 6 is next placed in position and locked therein by the bayonet slot connection. The casing is then placed in position upon the pot, and boiling water poured into the upper end. The water flows downwardly, striking the plate 6 and spreading out whence it slowly passes through the openings in such plate and into the ground coffee in the container 3. Passing through the coffee, the brew is filtered through the filter medium 4 and then passes into the pot 1. It will be noted that the perforations in the bottom 12 are more numerous and substantially smaller than those in the bottom 15, hence the coffee brew does not tend to collect in the spaces between the container 3 and the casing 2. This arrangement, and also the provision of the ground coffee container 3 enables the production of a brew of substantially constant quality of from one cup to the capacity of the supplementary container. Thus, a small quantity of coffee may be brewed in this maker.

In brewing an amount of coffee in excess of the capacity of the supplementary container 3, same may be removed and the ground coffee placed directly in the bottom of the casing 2. Baffle plate 6 is then locked in place with its circumferential edge resting upon the shoulder 11$^a$. In the design shown, the water capacity of the casing 2, above the baffle plate 6, is four cups, while the capacity of the pot 1 below the bottom 12 of casing 2, is six cups. Therefore, in making a six cup brew, sufficient ground coffee therefore, will be placed in the maker, two cups of boiling water placed in the pot, the maker placed on the pot, and then four cups of boiling water placed in the casing 2. This will filter through and emulsify with the water in the pot, to form a perfect brew.

In order to obviate the necessity of using a pot cloth or other protection for the hands, to remove the maker from the pot, while hot, I provide notches and bosses 9, so that the maker may be removed by lifting it with the cover handle 8. The cover 7 may then be locked on the pot in a similar manner.

It will be noted that the water compartment of the casing 2 extends for its greater length into the pot 1. This is done in order that the brew may be served from the pot without removing the maker and without danger of the maker becoming displaced. The number and size of the holes in the several parts are of such dimensions as to properly time the passage of the water through the ground coffee to a fine degree, thus guarding against the passage of the water too quickly. The size, number and arrangement of these holes is essential to the proper operation of the device.

From the foregoing, it will be observed that an extremely simple and efficient coffee maker has been provided. The construction is such that the coffee does not rise above the baffle plate, but is retained entirely in the coffee compartment 3, thus avoiding the staining or accumulation of sediment that is so difficult to remove. The coffee is prevented from rising, due to two reasons; first, the number and size of holes in the baffle plate permit sufficient water accumulating in the coffee compartment to float the coffee, and second, the extruded handle on the baffle plate provides a dead air space for the air displaced in the coffee compartment by the entrance of the water thereto. In support of the cleanliness of the device, it has been found by actual test, that after a brewing of coffee, there is no discoloration or soiling of the inside walls of the water compartment.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A drip coffee maker including, a receptacle member, a casing disposed thereon, and provided with a foraminous bottom portion, a ground coffee container disposed within said casing, said container provided with a foraminous bottom portion, a filtering element disposed between the bottom of said casing and said container and a baffle member arranged to fit within and engage said casing, said baffle member also being engageable with said container for securing said container in place.

2. In a drip coffee maker, a casing including an inwardly directed shoulder intermediate its end and a foraminous bottom portion, a ground coffee container including a flange for supporting said container from said shoulder and a foraminous bottom portion disposed in contiguous relation to the bottom portion of said casing, a filtering element disposed between the bottom of said container and said casing and a baffle member supported by said casing above said container, said baffle member including means engageable with said casing and with said container for securing said container in position.

3. In a drip coffee maker, a casing including an inwardly directed shoulder intermediate its end and a foraminous bottom portion, a ground coffee contianer including a flange for supporting said container from said shoulder and a foraminous bottom portion disposed in spaced parallel relation to the bottom portion of said casing, a filtering element disposed between the bottom of said container and said casing, the combined area of the perforations in said container being less than the perforations in said casing, the area of the perforations in the bottom of the container being inversely proportional to the width of the container and directly proportional to its depth.

4. A coffee maker for use upon a coffee pot including a hollow casing open at its top and provided with a foraminous bottom, said casing provided with an inwardly directed shoulder near its upper end for engagement with the top of the pot, a second shoulder near the bottom of the casing, a ground coffee container supported upon the last named shoulder, a baffle member also supported upon the last named shoulder and interlocking means between the baffle member and the casing.

5. A coffee maker comprising a casing having a reduced lower end provided with a foraminous bottom, an inwardly directed shoulder formed by the reduced end, a ground coffee container having a foraminous bottom positioned within said casing and having a flange adapted to rest upon the shoulder with its bottom in spaced relation to the bottom of the casing, a tubular handle carried by the container, a foraminous baffle member positioned in said casing and supported upon the said flange, interlocking means between the casing and the baffle, a cover for said casing and interlocking means between the cover and the casing.

6. In combination, a coffee pot and a coffee maker, said coffee maker including a water containing casing open at its top and having a foraminous bottom, a cover for said casing, a shoulder formed upon the casing adapted to rest upon the pot, a second shoulder formed upon the casing adjacent its lower end for supporting a ground coffee container and a flow timing baffle member, said container being open at its top and having a foraminous bottom, said baffle having a foraminous top, and a hollow extruded handle member, the space in the hollow handle being sufficient to entrap the air displaced in the coffee container of the casing without impeding or disturbing the flow of the water, the foramina of the baffle, the container and the casing being of such number and size as to properly time the passage of water therethrough.

7. A coffee maker, comprising a cylindrical casing enlarged at its upper end for forming a supporting shoulder, said casing having a foraminous bottom and open at its top, an interlocking cover for the open end, said casing reduced for forming a second shoulder serving as a support, a ground coffee container having a foraminous bottom and an open top, an annular outwardly extending flange formed upon the container and adapted to rest upon the last-named shoulder for supporting the container spaced from the walls and bottom of the casing, a centrally arranged tubular handle carried by the container and projecting for a substantial distance above the top thereof, a baffle member having a foraminous top and an extruded centrally arranged corrugated handle, interlocking means between the baffle and the walls of the casing, said first-named handle having its end terminating within the last-named handle.

8. A coffee maker of cylindrical formation, open at its top and provided with a foraminous bottom, said casing reduced in diameter near its lower end for forming an inwardly directed shoulder, the walls of said reduced portion tapering inwardly toward its bottom, a ground coffee container having a foraminous bottom and open upper end, said container provided with an outwardly directed annular flange adapted to rest upon the tapered side walls, said flange adapted to space the wall of the container throughout its length a substantial distance from the said casing wall, and a foraminous baffle member adapted to rest upon said shoulder.

In testimony whereof, I have hereunto set my hand at Chicago, Illinois this 30th day of June, 1932.

CHARLES E. PAGE.